G. WESTINGHOUSE, Jr.
Steam-Power Car-Brake Apparatus.
No. 5,506. Reissued July 29, 1873.
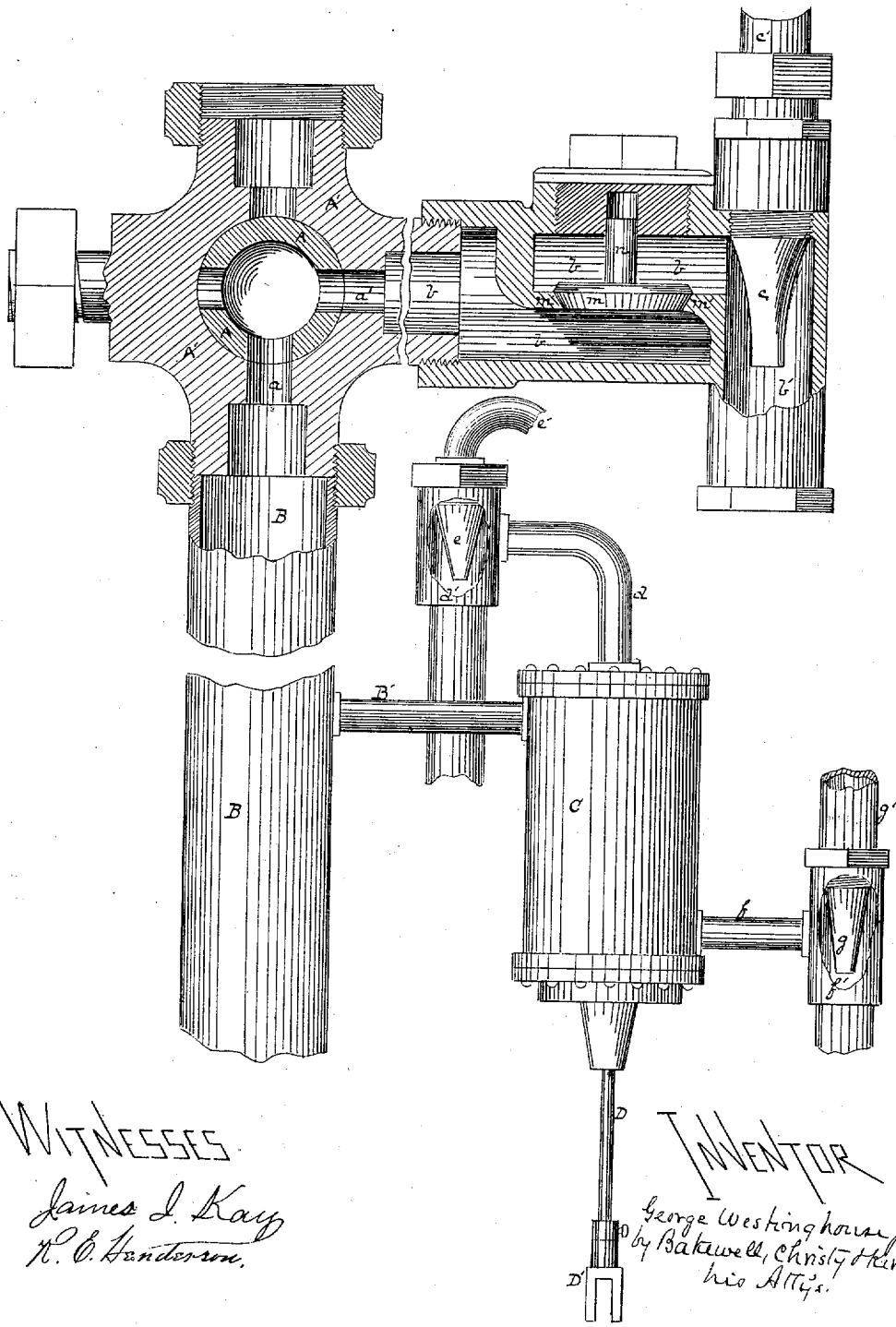
WITNESSES
James I. Kay
R. C. Henderson.
INVENTOR
George Westinghouse Jr.
by Bakewell, Christy & Kerr,
his Att'ys.
N. PETERS, Photo-Lithographer, Washington, D. C.

UNITED STATES PATENT OFFICE.

GEORGE WESTINGHOUSE, JR., OF PITTSBURG, PENNSYLVANIA.

IMPROVEMENT IN STEAM-POWER CAR-BRAKE APPARATUS.

Specification forming part of Letters Patent No. 115,667, dated June 6, 1871; reissue No. 5,506, dated July 29, 1873; application filed May 26, 1873.

*To all whom it may concern:*

Be it known that I, GEORGE WESTINGHOUSE, Jr., of Pittsburg, in the county of Allegheny and State of Pennsylvania, have invented a new and useful Improvement in Steam-Power Car-Brake Apparatus. I do hereby declare the following to be a full, clear, and exact description thereof, reference being had to the accompanying drawing, showing, by views partly in section and partly in plan, certain detached parts of my air-brake apparatus, already patented to me, and illustrative of the improvement for which I now desire Letters Patent.

My present invention relates to certain improvements in the steam-power air-brake patented to me 13th April, 1869. Of the parts described in that patent the accompanying drawing contains the three-way cock A A′, shown in horizontal sections through the ports, the air-pipes B B′ leading thence to the brake-cylinder C, which latter, as in that patent, is furnished with a piston, piston-stem D, and bifurcated head D′, all operated as in said patent set forth. In the patent referred to the brakes are described as being released or let off simply by turning the three-way cock to the position shown in the accompanying drawing. The air in the cylinder C in front of the piston then passes out by the pipes B′ B through the inlet-port *a* and out at the escape-port *a′*. I have found in practice that while the compressed air readily escapes in this way, it does not always release the brake-shoes from their hold on the wheels as instantaneously as could be desired on a train which has only time to make short stoppages, in case the piston and stem happen to work with some friction. For the purpose of guarding against the occurrence of this I have combined with the devices named what is commonly known as the steam siphon-pump, by the action of which the air is almost instantaneously exhausted from the cylinders down to or below ordinary atmospheric pressure, and thereby the brake-piston is forced back by the pressure on the opposite side thereby, and brakes are instantaneously released or let off.

To enable others skilled in the art to make and use my improvement, I will proceed to describe its construction and mode of operation.

The waste-pipe *b* communicates directly with the escape-port *a′*. On the outer end of it is a T-pipe, *b′*, in one end of which I screw the nozzle *c*, which, by a pipe, *c′*, communicates with either the steam-boiler for the injection of steam, or with the air-reservoir described in my patent of 13th April, 1869, for the injection of air.

The arrangement of the conical nozzle *c* with reference to the waste-pipe may be varied at pleasure, according to the known laws governing the operation of such devices. The nozzle *c* may be arranged directly in the waste-pipe *b*, but discharging in the direction of the outward flow of air.

When it is desired to let off the brakes the cock A is turned to the position shown. A jet of steam or compressed air, preferably the former, is turned into the pipe *c′*, which, passing out through the nozzle *c*, exhausts the air from the brake-cylinder C through the communicating pipes and ports, and almost instantaneously lets off the brakes.

As a modification thereof I have shown a pipe, *d*, leading direct from the end of the cylinder C in front of the piston, onto which is fastened a T-pipe, *d′*. In the latter is arranged a nozzle, *e*, similar in construction to that last described, taking steam or compressed air through a pipe, *e′*, in like manner and with like effect, and capable of like modifications as to form and arrangement. By reversing the arrangement of the brake-levers this combination may also be applied to put on as well as let off the brakes.

The steam siphon-pump may be otherwise combined with the brake-cylinder so as to apply or put on the brakes by means of the exhaustion of the air from the cylinder back of the piston—*i. e.*, on the side toward which it moves in applying the brakes—instead of the compression of the air in the cylinder in front of the piston.

To illustrate this I have shown a pipe, *f*, leading from the end of the cylinder C toward which it is desired the piston should travel in applying the brakes. The outer end of this communicates with a T-pipe, *f*, in which is arranged a conical nozzle, *g*, as already described, and capable of like modifications. Compressed air or steam then being passed through the pipe $g'$ and nozzle $g$, the air will be exhausted from the cylinder C back of the piston, which will cause the latter to travel back, and, through its stem D, to operate the brake-levers and apply the brakes, as in my previous patent set forth.

If steam be used in exhausting the air from the cylinder C, it will be found sometimes that after the exhaustion has been carried below atmospheric pressure, a reaction will take place, which, if not provided against, will carry some of the steam back through the air-outflow pipes into the cylinder C, where it condenses, and where the presence of water is objectionable. To prevent this inflow of steam I arrange, at any desired point back of the steam-discharging pipe, and between it and the cylinder C, a check-valve, $m$, seat it in a diaphragm, $m'$, and guide it by a stem, $n$, or in other known way.

As shown, the valve $m$ seats itself by its own weight; but it may be placed in any other desired position, and be seated by a spring or other equivalent device. Such a valve may be arranged in any of the pipes $b$ $d$ $f$. As thus arranged it permits the outflow of air, but prevents the inflow of steam when the reaction of atmospheric pressure takes place.

What I claim as my invention, and desire to secure by Letters Patent, is—

1. A steam or air discharging nozzle, arranged in the air-outflow pipe of a car-brake cylinder, discharging in the direction of the outflow of air from the cylinder, and in combination with such cylinder, substantially as described.

2. In combination with the subject-matter of the previous claim, a check-valve, $m$, arranged substantially as set forth.

3. In a power-brake apparatus, a brake-cylinder and piston in which air pressure is applied to one side of the piston in order to apply the brakes, and to the opposite side to release them.

In witness whereof I, the said GEORGE WESTINGHOUSE, Jr., have hereunto set my hand.

GEORGE WESTINGHOUSE, Jr.

Witnesses:

T. B. KERR,

G. H. CHRISTY.